United States Patent [19]

Maruyama et al.

[11] Patent Number: 5,296,276
[45] Date of Patent: Mar. 22, 1994

[54] SEAMLESS ENDLESS BELT

[75] Inventors: Satoshi Maruyama; Kenji Tateishi, both of Kagawa; Kazuo Kondo, Marugame, all of Japan

[73] Assignee: Okura Industrial Co., Ltd., Japan

[21] Appl. No.: 809,170

[22] Filed: Dec. 18, 1991

[30] Foreign Application Priority Data

Dec. 28, 1990 [JP] Japan .................. 2-416979
Jan. 18, 1991 [JP] Japan .................. 3-18443
Jun. 12, 1991 [JP] Japan .................. 3-167555

[51] Int. Cl.$^5$ .............................. B27N 5/02
[52] U.S. Cl. ................... 428/35.7; 428/36.9; 428/36.91; 428/411.1; 428/423.1; 428/425.3; 428/524; 428/525; 428/910
[58] Field of Search ............. 428/425.3, 524, 35.7, 428/36.8, 424.8, 525, 423.1, 411.1, 910, 36.91, 36.9; 264/288.4, 289.3, 290.2

[56] References Cited

U.S. PATENT DOCUMENTS

| | | | |
|---|---|---|---|
| 4,359,501 | 11/1982 | DiTullio | 428/245 |
| 4,687,615 | 8/1987 | Kondo | 264/289.3 |
| 4,772,253 | 9/1988 | Koizumi | 428/192 |
| 4,796,749 | 1/1989 | Lefferts | 428/222 |
| 5,128,091 | 7/1992 | Agur | 264/235 |

*Primary Examiner*—Ellis P. Robinson
*Assistant Examiner*—Timothy M. Speer
*Attorney, Agent, or Firm*—Lorusso & Loud

[57] ABSTRACT

A seamless endless belt formed of a polyether-ether-ketone resin subjected to a specific simultaneous inflation-and-biaxially stretching treatment followed by an optional specific thermosetting/relaxation treatment as well as a process for manufacturing same is disclosed. This belt is manufactured by biaxially stretching a tube of a polyether-ether-ketone resin while inflating the tube at a temperature above the glass transition temperature of the resin but below the melting point of the resin, optionally and preferably thermosetting the stretched tube at 150°–320°C. while relaxing it at a rate of relaxation of 5–30% and then cutting the resultant tube in round slices. The stretched tube may be laminated with a tube of a thermoplastic polyurethane resin so as to form a laminate tube formed of a polyether-ether-ketone resin in the outer and inner tubes with, interposed therebetween, an intermediate tube of a thermoplastic polyurethane resin. A seamless endless tube is manufactured also from the laminate tube in such manner that the laminate tube is heated above the melting point of the polyurethane resin whereby the outer and inner tubes of the polyether-ether-ketone resin are thermoset while being relaxed and the intermediate tube of the polyurethane is melted and integrally bonded to the outer and inner tubes to form an integrally bonded laminate tube which is cut to form a seamless endless belt. The belt thus obtained is excellent in heat-resistance, dimensional stability at a high temperature and mechanical strength and can be used as a conveyer belt or the like especially in electronic apparatus where the belt moves smoothly without any elongation or contraction, even in severe service.

5 Claims, No Drawings

SEAMLESS ENDLESS BELT

BACKGROUND OF THE INVENTION

1. Field of the Invention

The present invention relates to an improved seamless endless belt having excellent heat resistance and dimensional stability and to a process for manufacturing same. More particularly, the present invention relates to a seamless endless belt utilizable in high temperature applications, for example, a conveyer belt utilizable for conveying sheets of paper for ink-jet printers and a belt for image-fixing in printers and facsimile machines, which requires high precision in dimensional size, contraction-resistance, mechanical strength and heat resistance as well as a process for manufacturing same involving the step of simultaneous inflation-and-biaxially stretching of a polyether-ether-ketone resin.

2. Description of the Prior Art

An endless belt made of a synthetic resin has excellent mechanical strength per unit thickness as compared with a conventional endless belt made of rubber. Accordingly, the former belt is advantageous in that the thickness of the belt can be reduced so as to make the device lightweight and to be used at a relatively high temperature by virtue of reduced heat accumulation. Furthermore, the former belt is superior in processability so that it may be blended with various resins possessing favorable characteristics to manufacture a belt of desired properties. These beneficial properties make the former belt useful for various applications where the device is desired to be smaller or lightweight. In general, an endless belt of a synthetic resin is manufactured by bonding both end portions of a strip of a synthetic resin film by the aid of a binder or by fusing the end portions together and then cooling to effect bonding. However, the endless belt thus formed has a step at the seam where both ends of the resin film overlap, so that the movement of the belt becomes unstable at the seam, or otherwise, the belt tends to be damaged or broken at the seam with lapse of time.

In order to overcome the above problems, a seamless endless belt was proposed which is manufactured by cutting a tube of a synthetic resin in round slices perpendicular to the longitudinal direction of the tube. The belt of this type is seamless so that care is unnecessary for controlling the position of the seam and moving parts can thus be simplified. Further, there is an additional advantage that the life of the belt is prolonged and the movement of the belt becomes smooth. Accordingly, such a seamless endless belt finds wide industrial applications as a conveyer or power transmission belt.

The seamless endless belts are thus advantageous in a wider variety of applications as compared with ordinary belts having a seam, but require various characteristics depending on the intended use. Especially, the following characteristics are required for general applications: low contraction and elongation at high temperatures, good dimensional stability in particular at high temperatures, no fluctuation in thickness, and high mechanical strength, especially tensile strength and Young's modulus for withstanding heavy load during continuous use. These characteristics depend greatly on the physical and mechanical properties of the starting synthetic resin and also on the processing conditions for manufacturing the tube from the resin. In case such a seamless endless belt is to be utilized for electronic apparatus, it is especially required that the belt have excellent precision of size, in particular, diameter. This precision in size of the diameter is necessary not only at the time of manufacturing the belt but also after the continuous use of the belt for a long period of time. Accordingly, the belt should have an extremely low rate of thermal contraction especially at a high temperature, a high elasticity over a wide range of temperature to prevent change in size from elongation caused by high tension, and a precision in thickness devoid of any fluctuation.

When such a seamless endless belt is used, for example, as a conveyer belt for conveying sheets of paper in an ink-jet printer or as a belt for image-fixing in a printer or facsimile machine, the belt is exposed to high temperature since the ink-jet printer uses a molten hot-melt type ink and the fixing is carried out by using a toner at a temperature as high as 150° C. or more. When the belt is used for the above mentioned applications, it must be furnished with such a characteristic that no fluctuation in dimension occurs even at a high temperature above 200° C. and a certain degree of mechanical strength is exhibited at such high temperatures.

Among synthetic resins, polyester resin has recently become regarded as having strong mechanical properties and good processability. In addition, the so-called biaxially stretching technique is known to increase the mechanical strength of a film. In view of the above circumstances, a seamless endless belt shaped from a biaxially stretched tube of a thermoplastic polyester resin was proposed for satisfying the above mentioned requirements to a certain degree. As the polyester resin generally has a glass transition temperature lower than 100° C., the use of a seamless endless belt manufactured from the polyester resin at temperatures exceeding 150° C. significantly deteriorates the tensile strength and Young's modulus so that the belt is elongated by load or contracted on account of residual strain at the time of shaping. For these reasons, there is a great demand for developing a seamless endless belt which is extremely high in dimensional stability and is utilizable at a high temperature.

In general, seamless endless tubes are manufactured by cutting a tube in round slices perpendicular to the longitudinal direction of the tube, irrespective of what resin is employed as a material. In order to obtain seamless endless belts excellent in mechanical strength and running stability, the starting seamless tube should have a thickness of at least 50 μm. For obtaining a tube having a thickness of 50 μm or more and improved in tensile strength, breakdown elongation, Young's modulus and stiffness by the biaxial stretching treatment, however, the unstretched starting tube to be subjected to the treatment must have a thickness of 3–16 times as much as the resultant stretched tube. It is extremely difficult to manufacture unstretched tubes excellent in precision of thickness satisfying the above criterion. Furthermore, in case too thick an unstretched tube is stretched according to the inflation method, there arises the problem that a significantly high stress is needed and fluctuation tends to occur in thickness.

In view of the foregoing, it is extremely difficult to provide a seamless endless belt utilizable for electronic apparatus having high heat-resistance, dimensional stability, mechanical strength and moving stability as well as a process for manufacturing such tube. Accordingly, there is a great demand in this art for developing such seamless endless tubes and a new process for manufacturing same.

BRIEF SUMMARY OF THE INVENTION

It is an object of the present invention to provide a seamless endless belt comprised of a polyether-ether-ketone resin which has a high temperature-resistance, strong mechanical properties and dimensional stability.

It is another object of the present invention to provide a seamless endless belt comprised of a polyether-ether-ketone resin which has a low rate of contraction less than 2% at 200° C. and a modulus of elasticity above 70 kg/mm$^2$ in the direction of movement.

It is still another object of the present invention to provide a seamless endless belt having a high temperature resistance, strong mechanical strength and dimensional stability, which is constructed of laminated tubular layers; the outer and inner layers being comprised of a polyether-ether-ketone resin and the intermediate layer being comprised of a thermoplastic polyurethane resin.

It is a further object of the present invention to provide a process for manufacturing a seamless endless belt which comprises subjecting a tube of a polyether-ether-ketone resin to a simultaneous inflation-and-biaxially stretching treatment and cutting the resultant tube into round slices.

It is a still further object of the present invention to provide a process for manufacturing a seamless endless belt which comprises subjecting a tube of a polyether-ether-ketone resin to a simultaneous inflation-and-biaxially stretching treatment, thermosetting the resultant tube while being relaxed and cutting it into round slices.

It is yet further object of the present invention to provide a process for manufacturing a seamless endless belt which comprises heating a laminate tube prepared by interposing a thermoplastic polyurethane tube between biaxially stretched tubes of a polyether-ether-ketone resin and cutting the laminate tube into round slices.

Other and further objects, features and advantages of the present invention will become more fully apparent from the following description.

DETAILED DESCRIPTION OF THE INVENTION

As a result of extensive research made for developing a new type seamless endless belt possessing a high level of heat-resistance, mechanical strength and dimensional stability, it has now been found that a seamless endless belt comprised of a polyether-ether-ketone resin, which is manufactured by subjecting a tube of the polyether-ether-ketone resin to simultaneous inflation-and-biaxially stretching treatment, if necessary, thermosetting the tube while being relaxed and cutting it into round slices perpendicular to the longitudinal direction of the tube, has excellent heat-resistance, strong mechanical properties, including tensile strength, and dimensional stability and is suitable as a conveyer belt or power transmission belt for use in electronic apparatus where a high level of heat-resistance and dimensional stability is required for the belt.

In accordance with one aspect of the present invention, there is provided a seamless endless belt cut into round slices from a tube of a polyether-ether-ketone resin subjected to a simultaneous inflation-and-biaxially stretching treatment wherein the tube has been stretched in both lateral and longitudinal directions by at least 2 times its original dimensions at a temperature above the glass transition temperature of the resin but below the melting point of the resin.

In accordance with another aspect of this invention, there is provided with a seamless endless belt cut into round slices from a tube of a polyether-ether-ketone resin subjected to a simultaneous inflation-and-biaxially stretching treatment wherein the tube has been stretched in both lateral and longitudinal directions by at least 2 times its original dimensions at a temperature above the glass transition temperature of the resin but below the melting point of the resin, and thereafter to a thermosetting/relaxation treatment wherein the tube is thermoset at a temperature of 150°-320° C. while being relaxed at a rate of relaxation of 5-30%.

In a further aspect of the present invention, there is provided with a process for manufacturing a seamless endless belt which comprises subjecting a tube of a polyether-etherketone resin to a simultaneous inflation-and-biaxially stretching treatment wherein the tube is stretched in both lateral and longitudinal directions at a temperature above the glass transition temperature of the resin but below the melting point of the resin, and thereafter cutting the treated tube into round slices perpendicular to the longitudinal direction of the tube.

In yet a further aspect of the present invention, there is provided a process for manufacturing a seamless endless belt which comprises subjecting a tube of a polyether-ether-ketone resin to a simultaneous inflation-and-biaxially stretching treatment wherein the tube is biaxially stretched in both lateral and longitudinal directions by at least 2 times its original dimensions at a temperature above the glass transition temperature of the resin but below the melting point of the resin, then to a thermosetting/relaxation treatment wherein the tube is thermoset at a temperature of 150°-320° C. while being relaxed at a rate of relaxation of 5-30%, and thereafter cutting the treated tube into round slices perpendicular to the longitudinal direction of the tube.

In general, a film or tube of a synthetic resin scarcely contracts below a certain temperature. As the temperature is raised, however, the rate of contraction tends to increase gradually. Accordingly, a belt manufactured from such a tube cannot be used for electronic apparatus where the belt is exposed to a high temperature. Thus, one feature of the invention is that air is introduced into a tube of the polyether-ether-ketone resin to inflate it and simultaneously to stretch it biaxially in longitudinal and lateral directions by at least 2 times its original dimensions whereby the tube is increased in mechanical strength and dimensional stability. The treatment for effecting biaxially stretching of the tube simultaneously with inflation by air is referred to herein as "simultaneous inflation-and-biaxially stretching treatment." This treatment is carried out at a temperature above the glass transition temperature of the resin but below the melting point of the resin. It is preferred that the biaxially stretched tube is thermoset at a specific temperature while being relaxed, prior to cutting it into round slices to form a belt. On using the thermoset belt in electronic apparatus, it neither contracts nor deforms at a high temperature over a prolonged period of time.

If the thickness of the biaxially stretched tube is thin, it is found that its mechanical strength somewhat deteriorates at a high temperature. In such case, however, it has been found that the above disadvantage can be overcome by laminating the tube with a layer of an elastic thermoplastic polyurethane resin. More precisely, it has now been found that a laminate tube manufactured by interposing a tube of a thermoplastic polyurethane resin between the inner and the outer tubes of a polyether-ether-ketone resin and heating the laminate tube so as to thermoset the polyether-ether-ketone resin and to bond the polyurethane resin to the polyether-ether-ketone resin by fusing has excellent heat-resistance, mechanical strength, especially tear strength and dimensional stability and affords a seamless endless belt of better quality as compared with a seamless endless belt comprised of a polyether-ether-ketone resin alone.

In accordance with a further aspect of the present invention, there is provided a seamless endless belt shaped from laminated tubes of resins. The outer and inner tubes (A) and (C) comprise a polyether-ether-ketone resin subjected to a biaxially stretching treatment wherein the resin has been stretched in both lateral and longitudinal directions by at least 2 times its original dimensions at a temperature above the glass transition temperature of the resin but below the melting point of the resin. The intermediate tube (B) comprises a thermoplastic polyurethane resin. The outer and inner tubes (A) and (C) and the intermediate tube (B) are integrally bonded and the outer and inner tube (A) and (C) have been thermoset by heating while being relaxed.

In yet a further aspect, the present invention provides a process for manufacturing a seamless endless belt which comprises putting on a cylindrical drum two tubes (A),(C) of a polyether-ether-ketone resin having an inner diameter of 0.95–1.10 times the outer diameter of the drum and a tube (B) of a thermoplastic polyurethane resin interposed between the two tubes and having an inner diameter of 0.60–1.10 times the outer diameter of the drum. The two tubes (A) and (C) are previously subjected to a simultaneous inflation-and-biaxially stretching treatment wherein the tubes are stretched in both lateral and longitudinal directions by at least 2 times their original dimensions at a temperature above the glass transition temperature of the resin but below the melting point of the resin. The laminated tubes (A), (B) and (C) are heated at a temperature above the melting point of the thermoplastic polyurethane resin but below the melting point of the polyether-ether-ketone resin whereby the tubes (A) and (C) are thermoset and the tube (B) is bonded integrally to the tubes (A) and (C). The laminated tubes are thereafter shaped to form a seamless endless belt.

In summary, the present invention provides firstly, a seamless endless belt manufactured from a tube comprised of a polyether-ether-ketone resin subjected to the simultaneous inflation-and-biaxially stretching treatment optionally followed by a specific thermosetting treatment or from a tube comprised of a laminate of the above polyether-ether-ketone resin and a thermoplastic polyurethane resin. Secondly the present invention provides a process for manufacturing the seamless endless belt by subjecting a tube of a polyether-ether-ketone resin to a simultaneous inflation-and-biaxially stretching treatment followed by an optional thermosetting treatment and the shaping of the resultant tube into seamless endless belts or by laminating the resultant tube with a tube of a thermoplastic polyurethane resin, heating the laminate tube to effect its integral bonding and shaping the laminate to a seamless endless belt or belts.

In general, a tube of a synthetic resin is scarcely contracted below a certain degree of the temperature. When the temperature is raised beyond the certain degree, however, the rate of contraction tends to increase gradually. In case a seamless endless belt comprised of a synthetic resin having such tendency is used for electronic apparatus, especially as a conveyer belt for supplying sheets of paper to ink-~et printers or as an image-fixing belt in printers or facsimile machines where the temperature of the seamless endless belt reaches usually about 150° C. or higher than 200° C. in some cases, the seamless endless belt may significantly shrink during the use in case of a rate of contraction higher than 2% at 200° C., so that the tension of the belt is increased and creates, in movement, moving wrinkle waves in the longitudinal directions to deteriorate smoothness of the belt significantly.

It is also known that synthetic resins generally rapidly lose tensile strength and modulus of elasticity when heated above their glass transition temperature. Although a polyether-ether-ketone resin is said to be a resin excellent in heat-resistance, the glass transition temperature of a typical polyether-ether-ketone resin is 143° C. and so a seamless endless belt comprised of such polyether-ether-ketone resin becomes poor in modulus of elasticity in use at temperatures exceeding 200° C. as compared with the case used at ordinary temperature. Depending on selection of the conditions for stretching and thermosetting the tube in the course of manufacturing the seamless endless belt, the modulus of elasticity in the moving direction of the belt at 200° C. may become 70 kg/mm$^2$ or less, i.e. the modulus of elasticity of ordinary synthetic resin such as polypropylene at normal temperature. In case a belt of such poor mechanical strength is used at a high temperature, the belt will permit elongation due to creeping to cause slip of the belt.

In case a thermoplastic resin is stretched for shaping, the resin generally begins to shrink at around the stretching temperature. It is well known that a film of a thermally contracting resin can be used for shrink-package utilizing such property. In the present invention, however, a polyether ether-ketone resin having a high glass transition temperature is used as the thermoplastic resin. Accordingly, the temperature for biaxially stretching the resin is extremely high and the temperature for initiating thermal contraction of the resin also becomes higher as compared with other thermoplastic resins. In the present invention, therefore, a seamless endless belt which is very small in coefficient of thermal contraction and excellent in dimensional stability is obtained from a tube comprised of a polyether-ether-ketone resin having inherently strong heat-resistance and good mechanical strength. Such excellent properties warrant that the belt is neither elongated nor loosened during use at a high temperature.

In the present invention, any known polyether-ether-ketone resin can be used. The typical polyether-ether-ketone has a structure represented by the general formula:

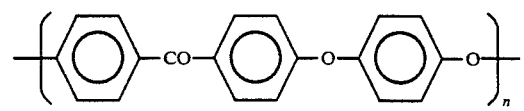

wherein n stands for a positive integer. The polyether-ether-ketone resin can be used singly but may be blended with other thermoplastic synthetic resins such as polyethersulfone so long as the characteristics of the polyether-ether-ketone resin are not adversely affected. In addition to these resins, ordinary additives such as a modifier, a pigment, a dye and a filler may be used in a small amount together with the polyether-ether-ketone resin. Illustrative of the additives are, for example, a substance capable of imparting conductivity or insulating property to the belt, such as organic conductive polymers, inorganic conductive particles including carbon black, Braphite, stannic oxide, indium oxide, elementary silver, copper, and nickel, and antistatic agents. It is a matter of course that these additives should not denature the polyether-ether resin nor decompose during the processing of the resin.

It is one of the characteristic features of this invention that a tube of the polyether-ether-ketone resin is subjected to the aforesaid specific simultaneous inflation-and-biaxially stretching treatment. An unstretched tube of the polyether-ether-ketone resin usually has high heat-resistance but its Young's modulus is 20,000–25,000 kg/cm$^2$ and breakdown elongation is more than 200% so that there may be some practical problem on using a belt directly manufactured from the tube; the belt is elongated or deformed under somewhat heavy load. By effecting the simultaneous inflation-and-biaxially stretching treatment of the tube according to the present invention, however, Young's modulus and mechanical strength such as tensile strength are significantly enhanced as compared with the case of the unstretched tube. Accordingly, the belt of this invention possesses ideal properties necessary for use in electronic apparatus since the belt is not elongated or loosened for a long period of time at a high temperature. This simultaneous inflation-and-biaxially stretching treatment will be explained in detail hereinafter.

It is another characteristic feature of this invention in particular in the variant of the first embodiment that a tube of the polyether-ether-ketone resin subjected to the simultaneous inflation-and-biaxially stretching treatment is successively thermoset while being released under a specific condition. This treatment is referred to herein arbitrarily as "thermosetting/relaxation treatment". This treatment which will also be detailed hereinafter serves to further enhance dimensional stability of the belt at a high temperature. The thermosetting/relaxation treatment of the tube serves to eliminate any internal strain at the time of stretching the tube and to fix the orientation so that thermal contraction of the tube is reduced to enhance dimensional stability.

The seamless endless belt of the present invention is manufactured according to the following various methods:

In the first embodiment of the present invention, a polyether-ether-ketone resin is first placed in an extruder and heated at a temperature above melting point of the resin and the molten mass is extruded from the extruder through an annular die having a desired diameter. As the melting point of a typical polyether-ether-ketone resin is 343° C., this extrusion operation is usually carried out at a temperature between 370° C. and 420° C. The resultant tube extruded through the die is then cooled to a desired temperature. The tube of the polyether-ether-ketone resin thus obtained is used as a starting material in the process described below.

The tube is then heated in a cylindrical heater up to a temperature above the glass transition temperature of the polyether-ether-ketone resin used but below the melting point of the resin. In general, the temperature in this case is maintained at 140°–320° C., preferably at 170°–200 C. The tube is then subjected to the simultaneous inflation-and-biaxially stretching treatment in such manner that air is introduced into the tube to stretch it biaxially in the lengthwise direction and in the lateral direction while inflating the tube. The stretching ratio in this case is about 2–6 (2 to 6 times) in both lengthwise and lateral directions. If the stretching ratio becomes larger, Young's modulus and tensile strength of the tube will be increased correspondingly while breakdown elongation of the tube will be decreased. Accordingly, a better result will be obtained as the stretching ratio becomes higher. If the stretching ratio becomes too high, however, the stretched tube will become thin locally and will eventually be punctured. On the other hand, if the stretching ratio is too low, it will become extremely difficult to stretch the tube uniformly and fluctuation in thickness will tend to occur. Accordingly, the effect of stretching is not expected when the stretching ratio is too low. A preferable result is obtained when the stretching ratio is 2–3 times. When the stretching ratio is 2 times in the lateral direction, the tube of 50 mm in diameter naturally becomes 100 mm in diameter.

The thickness of the tube is determined properly according to the intended use of the belt to be manufactured. In general, the thickness is at least 20 μm, preferably at least 40 μm. The inner diameter of the tube can also be determined according to the length of the seamless endless belt to be manufactured.

The resultant biaxially stretched tube is remarkably improved in mechanical strength, especially tensile strength and dimensional stability at a high temperature as compared with unstretched tube.

This stretched tube is wound on a reel for storage but may be cut on demand perpendicular to the lengthwise direction of the tube at a given interval, i.e. the width of a seamless endless belt to be manufactured. This cutting operation per se is carried out in any of the conventional manners.

The resultant seamless endless belt has a sufficient flexibility for actual use and no fluctuation in thickness. As will be evident from the data in Example 1, the belt shows good quality kept at a high temperature.

In a variant of the first embodiment of this invention, a biaxially stretched tube of the polyether-ether-ketone resin is firstly manufactured according to the simultaneous inflation-and-biaxially stretching treatment in the same manner as described above. Next, the resultant stretched tube is subjected to the thermosetting/relaxation treatment wherein the tube is thermoset in a heating zone while being relaxed in such manner that an object of a cylindrical form defining the size is inserted into the tube and the tube kept at a given rate of relaxation.

Below is a detailed explanation of a method for conducting this thermosetting/relaxation treatment.

The biaxially stretched tube is first put on a metal drum having an outer diameter equal to the inner diameter of the desired belt and is then heated, for example, in a drying chamber for a given period of time at a given rate of relaxation. The rate of relaxation is calculated according to the following equation:

$$\text{Rate of relaxation (\%)} = \left(1 - \frac{P}{Q}\right) \times 100$$

wherein P stands for the inner diameter of the tube after relaxation and Q for the inner diameter of the tube before relaxation.

The amount of relaxation is usually set between 5-30%, preferably between 10-30%. If the amount of relaxation is less than 5%, the dimensional stability of the belt at a high temperature will scarcely be improved. In case the amount is less than 5%, for example, the coefficient of thermal contraction at 200° C. will not be less than 2% even if the thermosetting temperature is allowed to rise at 320° C. On the other hand, if the amount exceeds 30%, relaxation of orientation will take place and the breakdown elongation of the tube will become too large, thus reducing modulus of elasticity and tensile strength as resulting from biaxially stretching. The thermosetting temperature is related to the amount of relaxation and is set according to the intended use of the belt. The temperature initiating thermal contraction of the belt is generally influenced by the thermosetting temperature. In general, the thermosetting temperature is set within the range between 150° C. and 320° C., preferably between 200° C. and 300° C. (approximate, above the glass transition temperature of the resin). If a higher thermosetting temperature is selected, the molecular orientation produced in the manufacturing and stretching the tube will be set so that the coefficient of thermal contraction of the tube at a high temperature can be minimized and the temperature at which the contraction is initiated can be elevated. On the other hand, if the rate of contraction is higher at the time of thermosetting, the inner strain formed at the time of manufacturing and stretching the tube will be eliminated. Accordingly, a seamless endless belt of an extremely low level of thermal contraction can be obtained by suitably selecting the optimum condition for the thermosetting/relaxation treatment. If the thermosetting temperature exceeds 320° C., the temperature will approach the melting point of the resin so that the thermosetting will become difficult. Further, the use of such a high temperature is not economical from the viewpoint of the efficiency of energy. On the other hand, if the thermosetting temperature is lower than 150° C., the molecular orientation will not sufficiently be set even at the maximum relaxation so that the coefficient of thermal contraction of the resulting tube will become undesirably large. The time required for the thermosetting/relaxation treatment is at least 5 minutes, preferably 10-30 minutes, and more preferably about 20 minutes. If the time is less than 5 minutes, the effect of thermosetting will be insufficient so that a belt manufactured from the tube will have less dimensional stability when used for a long period of time at a high temperature. On the other hand, the upper limit for the time is governed only by economics; no additional effect is obtained if the time is prolonged beyond 30 minutes.

The thickness of the tube can properly be determined as described above according to the intended use of the belt to be manufactured. In general, the thickness is at least 20 µm, preferably at least 40 µm. The inner diameter of the tube can also be determined freely according to the intended use of the belt to be manufactured. However, the outer diameter of the metal drum must correspond to the length of the belt.

In the thermosetting/relaxation treatment of this invention, the reason why the stretched tube is put on a metal drum having an outer diameter equal to the inner diameter of a seamless endless belt to be produced is that a tube of the polyether-ether-ketone resin is thermally contracted by the heat generated during the thermosetting/relaxation treatment until the tube closely adheres to the outer surface of the metal drum whereby a tube having an inner diameter quite identical with the outer diameter of the drum and showing good precision of dimensions can be obtained.

The thermoset tube is cut, as in the same manner as described above, perpendicular to its length at a given interval to obtain seamless endless belts.

A seamless endless belt possessing the ideal coefficient of thermal contraction of less than 2% at 200° C. and modulus of elasticity of at least 70 kg/mm$^2$ in the moving direction can thus be obtained by subjecting the biaxially stretched tube to the above specific thermosetting/relaxation treatment, conducted at a temperature of 200-300° C. and at a rate of relaxation of 5-30%.

In the third embodiment of this invention, a seamless endless belt is manufactured from a laminate tube comprised of two biaxially stretched tubes of the polyether-ether-ketone resin (A),(C) and a tube of a thermoplastic polyurethane resin (B). Two biaxially stretched tubes of the polyether-ether-ketone resin (A) and (C) are first manufactured according to the aforesaid process described as the second embodiment of this invention. It is preferred that each of the polyether ether-ketone resin tubes (A) and (B) be preliminarily subjected to a thermal relaxation treatment before being laminated. The relaxation treatment may be performed in the manner as in the second embodiment. On the other hand, a tube of a thermoplastic polyurethane resin (B) is manufactured according to various methods. Such methods include, for example, a conventional melt-extrusion method wherein the resin in molten state is extruded from an extruder through an annular die, a conventional inflation-molding method and a conventional T-die method. In case of the T-die method, the resin is shaped in the form of a film. In this case, both ends of the film are sealed to form a cylindrical film having seam line. As the resin is molten during the treatment, however, no problem will occur in the use of such seamed cylindrical film.

Any of the known conventional thermoplastic polyurethane resin can be used in this invention as the intermediate layer. The majority of these resins are now commercially available. Especially preferable are those resins prepared from diols of long and short linear chains and an aliphatic or aromatic diisocyanate. The thermoplastic polyurethane resins utilizable for this invention include, for example, polyether-type, polyester-type and polyether-ester-type thermoplastic poly urethanes.

Next, these tubes (A), (B) and (C) are put on a cylindrical metal drum in the written order of succession. The outer diameter of the cylindrical metal drum is equal to the inner diameter of a seamless endless belt to be produced. Accordingly, the inner diameter of the tubes (A) and (C) are so selected as to be 0.95 to 1.30 times as much as the outer diameter of the metal drum. On the other hand, the inner diameter of the tube (B) is selected to be 0.60 to 1.10 times as much as the outer diameter of the metal drum. Prior to making a laminate tube, the tube (A) and/or (C) may be subjected to a preliminary thermosetting/relaxation treatment on the metal drum by heating it above the glass transition temperature of the resin but below the melting point of the resin while being relaxed a proper amount, e.g. 10-30%. If the inner diameter of the tube is too large and exceeds 1.30 times as much as the outer diameter of the drum, undesirable results will be obtained as a gap will be formed between the belt and the drum or the amount of relaxation will become too large. On the other hand, if the inner diameter of the tube is too small and is less than 0.95 times as much as the outer diameter of the drum, it will be extremely difficult to put the tube on the drum.

The laminated tubes are heated at a temperature above the glass transition temperature of the polyether-ether-ketone resin and above the melting point of the polyurethane resin but below the melting point of the polyether-ether-ketone resin. A preferred heating temperature is within the range from 150° C. to 300° C., desirably 200°-250° C. The tube (B) is molten at this temperature and integrally bonded to the tubes (A) and (C) to form an integrally combined laminate tube. On the other hand, the tubes (A) and (C) are concurrently thermoset whereby strain formed at the time of manufacturing the tubes is eliminated.

The heating time is properly selected according to the types of the resins used but is usually within the range of 20-60 minutes, which is sufficient to finish the above-described melting and thermosetting.

The thickness of each tube can properly be determined, for example, according to the intended use. The thickness of the tubes (A) and (C) of the polyether-ether-ketone resin may be identical or different. The absolute value of the thickness of each tube varies according to the width and the length of the seamless endless belt to be produced, but the thickness of each tube is preferably at least 20 μm. The length, i.e. the inner diameter of the belt can also be determine freely and the outer diameter of the metal drum is correspondingly determined.

The laminate tube thus obtained uses the polyether-ether-ketone resin excellent in heat-resistance and mechanical strength in the outer and inner layers so that the tube does not permit elongation or loosening under load even if used at a high temperature. In addition, the tube uses the elastic polyurethane resin in the intermediate layer so that the tube has excellent flexibility, elasticity, tear strength and durability as compared with the tube manufactured from the polyether-ether-ketone resin alone. The seamless endless belt manufactured from this laminate tube can be perforated without loss of mechanical strength since the intermediate layer of the polyurethane resin possesses a good tear strength. As the tube has a laminate structure, the total thickness of the tube will become at least 50 μm and in some cases more than 70 μm even if each tube has a thickness of 20-40 μm.

The laminate tube thus obtained is shaped to a seamless endless tube by cutting off both edge portions of the tube or cutting the tube in round slices as described above at an interval corresponding to the width of the belt.

One advantage of this invention that the seamless endless belt manufactured from a tube of the polyether-ether-ketone resin subjected to the simultaneous inflation-and-biaxially stretching treatment has excellent heat-resistance and mechanical strength, especially tensile strength. In addition, when the tube is successively subjected to the specific thermosetting/relaxation treatment, a remarkable improvement is achieved in the coefficient of thermal contraction to enhance dimensional stability at high temperature. Thus, a thin seamless endless belt having no fluctuation in thickness in addition to the above beneficial advantages can be obtained from the polyether-ether-ketone resin according to a rather simple process. It is also an advantage of this invention that a seamless endless belt of further improved physical characteristics can be obtained easily from a laminate tube comprised the tubes of the polyether-ether-ketone resin and the tube of the polyurethane resin without using any binder. As the seamless endless belt manufactured from the laminate tube shows a combination of the properties of excellent heat-resistance and mechanical strength represented by the polyether-ether-ketone resin and the flexibility and tear strength represented by the thermoplastic polyurethane resin, the belt can be used over a wide range of temperatures from ordinary temperature to about 150° C. (the melting point of the majority of polyurethane resins). As the polyurethane resin in the intermediate tube is at once molten and integrally bonded to the outer and inner tubes of the polyether-ether-ketone resin, a belt having a thickness beyond 50 μm can easily be manufactured.

Anyway, the seamless endless belt of this invention is, irrespective of whether it is manufactured from the polyether ether-ketone resin alone or the laminate tube, utilizable as a conveyer belt or transmission belt in an electronic apparatus where the belt is exposed under severe circumstances maintained at a high temperature where conventional endless belts can hardly be used.

The present invention will now be illustrated in more detail by way of Examples and Comparative Examples. The physical characteristics shown in these Examples and Comparative Example were measured according to the following methods, except for the amount of relaxation explained herein before.

Modulus of elasticity: Using Leovibron Model DDV-11-EP (Toyo Boldwin KK, Japan), the modulus of elasticity was measured at 200° C. in terms of storage modulus of elasticity.

Coefficient of thermal contraction: A test piece of 20 mm in width and 150 mm in length in the moving direction was cut out from the seamless endless belt to be tested. The test piece was marked with a bench mark at a distance of about 100 mm and hung vertically in a constant-temperature box kept at 200° C. After heating the test piece for 30 minutes, it is allowed to stand until cooled to room temperature, the distance between the bench marks was measured and the value TC calculated according to the following equation:

$$TC(\%) = \frac{L_1 - L_2}{L_1} \times 100$$

wherein TC stands for a coefficient of thermal contraction, $L_1$ for the distance in mm between the bench marks before heating, and $L_2$ for the distance in mm between the bench marks after heating.

Breakdown load: A film of 10 mm in width was measured for tensile strength according to ASTM D882 and the value was represented by a load at he time of breaking the film.

Tear strength: measured according to ASTM D-1938-67. Tensile strength and Young's modulus: measured according to ASTM D-882.

Glass transition temperature and Melting point: calculated from measurements according to DSC.

EXAMPLE 1

A polyether-ether-ketone resin (Trade name: Victrex, Imperial Chemical Industries (ICI), UK) was melted at 400° C. and extruded at the same temperature through an annular die 50 mm in diameter to manufacture a flexible tube. After cooling, the tube was heated up to 170° C. in a cylindrical heater and air was then introduced into the tube to stretch it by 3 times its length and by 3 times its width by inflating the tube, whereby a biaxially stretched tube of the polyether-ether-ketone resin was obtained which had a thickness of 50 μm and an inner diameter of 150 mm. The resultant tube was cut into round slices perpendicular to the length of the tube to form seamless endless belts having a width of 250 mm and an inner diameter of 150 mm. This seamless endless belt was used as a conveyer belt at 160° C. whereupon the belt moved smoothly without any elongation or loosening. Table 1 below shows various characteristics of the belt obtained. The seamless belt, when heated to a high temperature of, for example, 200° C., contracted by about 7%.

COMPARATIVE EXAMPLE 1

The same polyether-ether-ketone resin as used in Example 1 was melted at 400° C. and extruded at the same temperature through an annular die of 150 mm in diameter to manufacture a flexible tube. After cooling, the tube was wound on a reel as such (without being stretched) to form an unstretched tube of the polyether-ether-ketone resin having an inner diameter of 150 mm. The tube thus obtained was cut into round slices perpendicular to its length whereby seamless endless belts were obtained which had a width of 250 mm and an inner diameter of 150 mm. Table 1 below shows various characteristics of the belt obtained. The resultant belt started to shrink at 150° C. and was significantly deformed so that the belt could not be practically used.

COMPARATIVE EXAMPLE 2

A polyethylene terephthalate resin (Trade name: Mitsui PET, Mitsui Pet Resin, Japan) was melt-extruded through an annular die of 50 mm in diameter at 300° C. to manufacture a flexible tube. After cooling, the resultant tube was heated up to 130° C. in a cylindrical heater and air was then introduced into the tube to stretch it by 3 times its length and by 3 times its width whereby a biaxially stretched tube of the polyethylene terephthalate resin was obtained which had an inner diameter of 150 mm and a thickness of 50 μm. The resultant tube was similarly cut into round slices to obtain seamless endless belts having a width of 250 mm and an inner diameter of 150 mm. This seamless endless belt was used as a conveyor belt at 160° C. whereupon the tube decreased in inner diameter by thermal contraction and so was not smoothly moved. Table 1 below shows various characteristics of the tube obtained.

TABLE 1

| Example or Comparative Example | | Example 1 | Comparative Example 1 | Comparative Example 2 |
|---|---|---|---|---|
| Thickness | (μ) | 50 | 50 | 50 |
| Tensile strength | (kg/cm2) | 2,950/2,530 | 1,330/1,340 | 3,340/3,710 |
| Young's modulus of elasticity | (kg/cm2 × 103) | 36.4/44.0 | 25.0/23.5 | 34.7/39.9 |
| Elongation | (%) | 71/35 | 233/259 | 144/119 |
| Glass transition temp. | (°C.) | 148 | 148 | 78 |
| Melting point | (°C.) | 344 | 344 | 248 |
| Coefficient of Thermal contraction | (%) | | | |
| 80° C. | | 0/0 | 0/0 | 0/0 |
| 120° C. | | 0/0 | 0/0 | 22.5/15.4 |
| 160° C. | | 0.8/1.2 | — | 34.5/23.8 |

REMARKS

The data shown in Table 1 above, except for thickness, glass transition temperature and melting point, are shown for both directions (longitudinal/lateral).

As is evident from the data shown in Table 1, the stretched seamless endless belt obtained in Example 1 according to the simultaneous inflation-and-biaxially stretching treatment of this invention from a tube of the polyether-ether-ketone resin is superior in tensile strength and Young's modulus of elasticity to the unstretched seamless endless belt manufactured in Comparative Example 1 from a tube of the same polyether-ether-ketone resin and is higher in glass transition temperature and melting point as compared with the stretched seamless endless belt obtained in Comparative Example 2 from a tube of the polyethylene terephthalate resin. Accordingly, the seamless endless belt of the present invention hardly undergoes elongation or loosening, especially at a high temperature and is excellent in dimensional stability because of a low coefficient of thermal contraction, especially at a high temperature.

EXAMPLE 2

A polyether-ether-ketone resin (Trade name: Victrex, ICI, UK) was melted at 385° C. and extruded at the same temperature through an annular die of 75 mm in diameter to form a flexible tube. After cooling, the resultant tube was heated up to 170° C. in a cylinder heater and air was then introduced into the tube to stretch it by 2 times its length and by 2 times its width while inflating the tube whereby a biaxially stretched tube of the polyether-ether-ketone resin was obtained which had an inner diameter of 150 mm and a thickness of 50 μm. The stretched tube was then put on a metal drum of 142.5 mm in outer diameter and subjected to thermosetting conducted at 300° C. for 20 minutes while being relaxed 5%. The thermoset tube thus obtained was cut into round slices perpendicular to its length to form seamless endless belts having a width of 250 mm and an inner diameter of 142.5 mm. This seamless endless belt was used as a conveyer belt at 200° C. whereupon the belt moved smoothly without any elongation or loosening. Table 2 below shows various characteristics of the belt obtained.

EXAMPLE 3

A polyether-ether-ketone resin (Trade name: Victrex, ICI, UK) was melted at 385° C. and extruded at the same temperature through an annular die of 60 mm in diameter to manufacture a flexible tube. After cooling, the resultant tube was heated up to 170° C. in a cylindrical heater and air was then introduced into the tube to stretch it by 2.5 times its length and by 2.5 times its width while inflating the tube, whereby a biaxially stretched tube of the polyether-ether-ketone resin was obtained which had an inner diameter of 150 mm and a thickness of 50 μm. The stretched tube was then put on a metal drum of 135 mm outer diameter and subjected to thermosetting at 280° C. for 20 minutes while being relaxed 10%. The resultant tube was cut into round slices in the same manner as described in Example 3 to form seamless endless belts having a width of 250 mm and an inner diameter of 135 mm. This seamless endless belt was used at 200° C. whereupon the belt moved smoothly without any elongation or loosening. Table 2 below shows various characteristics of the endless belt obtained.

EXAMPLES 4-7

A polyether-ether-ketone resin (Trade name: Victrex, ICI, UK) was heated at 385° C. and extruded at the same temperature through an annular die of 50 mm in diameter to manufacture a flexible tube. After cooling, the resultant tube was heated up to 170° C. in a cylindrical heater and air was the introduced into the tube to stretch it by 3 times its length and by 3 times its width while inflating the tube whereby a biaxially stretched tube of the polyether-ether-ketone resin was obtained which had an inner diameter of 150 mm and a thickness of 50 μm. The stretched tube was then put on a metal drum having an outer diameter of 142.5 mm (Example 4), 135 mm (Example 5), 120 mm (Example 6) or 115.5 mm (Example 7) and subjected to thermosetting conducted for 20 minutes under the conditions as shown in Table 2. The resultant tube was cut into round slices in the same manner as described in Example 2 to obtain seamless endless belts having a width of 250 mm. This seamless endless belt was used as a conveyor belt at 200° C. whereupon the belt moved smoothly without any elongation or loosening. Table 2 below shows the thermosetting conditions and various characteristics of the seamless endless belts obtained in each Example.

TABLE 2

| Character-istics | Examples | | | | | |
|---|---|---|---|---|---|---|
| | 2 | 3 | 4 | 5 | 6 | 7 |
| Stretching ratio (times) | 2.0 | 2.5 | 3.0 | 3.0 | 3.0 | 3.0 |
| Amount of Relaxation (%) | 5 | 10 | 5 | 10 | 20 | 23 |
| Thermo-setting temperature (°C.) | 300 | 280 | 300 | 260 | 200 | 200 |
| Coefficient of contraction at 200° C. (%) | 1.2 | 1.0 | 1.8 | 1.9 | 2.0 | 1.8 |
| Modulus of elasticity at 200° C. (kg/mm$^2$) Precision in size | 73 | 110 | 199 | 163 | 138 | 110 |
| Length of circumference (mm) | 447.7 | 424.1 | 447.7 | 424.1 | 377.0 | 362.9 |
| +Error (%) | 0.01 | 0.02 | 0.02 | 0.02 | 0.03 | 0.03 |

TABLE 2-continued

| Character-istics | Examples | | | | | |
|---|---|---|---|---|---|---|
| | 2 | 3 | 4 | 5 | 6 | 7 |
| −Error (%) | 0.01 | 0.00 | 0.01 | 0.00 | 0.00 | 0.00 |

EXAMPLES 8 and 9

A polyether-ether-ketone resin (Trade name: Victrex, ICI, UK) was melted at 385° C. and extruded at the same temperature through an annular die of 50 mm in diameter to manufacture a flexible tube. After cooling, the resultant tube was heated up to 170° C. in a cylindrical heater and air was then introduced into the tube to stretch it by 3 times its length and by 3 times its width while inflating the tube whereby a biaxially stretched tube of the polyether-ether-ketone resin was obtained which had an inner diameter of 150 mm and a thickness of 50 μm. The stretched tube was put on a metal drum having an outer diameter of 150 mm (Example 8) or 114 mm (Example 9) and subjected to thermosetting conducted for 20 minutes under the conditions as shown in Table 3. The resultant tube was similarly cut into round slices to form seamless endless belts having a width of 250 mm. This seamless endless belt was used as a conveyer belt at 200° C. whereupon the belt obtained in Example 8 contracted and could not be moved smoothly while the seamless endless belt obtained in Example 9 gradually loosened under load and soon could not be used. Table 3 below shows the thermosetting conditions and various characteristics of the seamless endless belt obtained in each Example.

TABLE 3

| Characteristics | Examples | |
|---|---|---|
| | 8 | 9 |
| Stretching ratio (times) | 3.0 | 3.0 |
| Amount of Relaxation (%) | 0 | 24 |
| Thermosetting temperature (°C.) | 300 | 180 |
| Coefficient of contraction at 200° C. (%) | 7.2 | 6.0 |
| Modulus of elasticity at 200° C. (kg/mm$^2$) Precision in size | 206 | 108 |
| Length of circumference (mm) | 471.2 | 358.1 |
| +Error (%) | 0.04 | 0.02 |
| −Error (%) | 0.02 | 0.00 |

COMPARATIVE EXAMPLE 3

A polyethylene terephthalate resin (Trade name: Mitsui PET, Mitsui Pet Resin, Japan) was heated at 290° C. and extruded at the same temperature through an annular die of 50 mm in diameter to manufacture a flexible film. After cooling, the resultant tube was heated up to 150° C. in a cylindrical heater and air was then introduced into the tube to stretch it by 3 times its length and by 3 times its width while inflating the tube, whereby a biaxially stretched tube of the polyethylene terephthalate was obtained which had an inner diameter of 150 mm. The stretched tube was thermoset at 190° C. while being relaxed by 15% to obtain a thermoset tube of the resin having an inner diameter of 127 mm and a thickness of 50 μm. The resultant tube was similarly cut into round slices to obtain seamless endless belts having a width of 250 mm and an inner diameter of 127 mm. The seamless belt was found to have a modulus of elasticity of 50 kg/mm² at 160° C., relaxation of 15%, a tensile strength of 1,600/1,600 kg/cm², an elongation of 82/90%, and coefficients of thermal contraction at 100° C. and 150° C. of 0/0% and 4.5/3.1%, respectively.

EXAMPLE 10

(1) Manufacture of a biaxially stretched tube of a polyether-ether-ketone resin.

A polyether-ether-ketone resin (Trade name: Victrex, ICI, UK) was melted and extruded at 400° C. from an extruder through an annular die of 50 mm in diameter to manufacture a flexible tube. After cooling, the resultant tube was heated up to 170° C. in a cylindrical heater and air was then introduced into the tube to stretch it by 2.5 times its length and by 3 times its width while inflating the tube, whereby two kinds of biaxially stretched tubes of the polyether-ether-ketone resin were obtained which were 134 mm in inner diameter and 25 μm and 40 μm in thickness.

(2) Manufacture of a tube of a thermoplastic polyurethane resin.

A thermoplastic polyurethane resin (Trade name: Elastran C-85A, Takeda-Badisch Urethane Ind. Co., Ltd., Japan; melting point: 195° C.) was melt-extruded at 195° C. through an annular die to manufacture a tube of the thermoplastic polyurethane resin having an inner diameter of 120 mm and a thickness of 30 μm.

(3) Manufacture of the laminated tube.

The biaxially stretched tube obtained in the foregoing (1) having an inner diameter of 134 mm and a thickness of 25 μm was put on a cylindrical metal drum of 113 mmφ and preliminarily relaxed at 230° C. for 25 minutes to effect thermosetting thereby obtaining a biaxially stretched tube of the polyether-etherketone resin (A),(C) having an inner diameter of 113 mm. The rate of relaxation in this case was 16%. The cylindrical metal drum having an outer diameter of 113 mmφ was overlaid with the tube (A), the thermoplastic polyurethane tube (B) obtained in the foregoing (2) of 110 mm in inner diameter and the tube (C) in that order, and the laminate was heated at 230° C. for 40 minutes whereby the tubes (A) and (C) were thermoset while the tube (B) was melted and firmly bonded to the tubes (A) and (C) to form an integrally bonded laminate tube. The resultant laminate tube was finished by cutting edges on both sides to obtain a seamless endless belt having an inner diameter of 113 mm, a width of 250 mm and a thickness of 91 μm. Table 4 below shows various characteristics of the seamless endless belt obtained.

EXAMPLE 11

The biaxially stretched tube obtained in Example 10-(1) having an inner diameter of 134 mm and a thickness of 40 μm was put on a cylindrical metal drum of 113 mmφ and preliminarily relaxed at 230° C. for 25 minutes to effect thermosetting whereby a biaxially stretched tube of the polyether-ether-ketone (A),(C) having an inner diameter of 113 mm was obtained. The relaxation in this case was 16%. The cylindrical metal drum was overlaid with the tube (A), the thermoplastic polyurethane tube (B) and the tube (C) in that order, and the laminated tube was then heated at 230° C. for 40 minutes whereby the tubes (A) and (C) were thermoset while the tube (B) was melted and firmly bonded to the tubes (A) and (C). The resultant laminate tube was made up by cutting edges on both sides to obtain a seamless endless belt having an inner diameter of 113 mm, a width of 250 mm and a thickness of 121 μm. Table 4 below shows various characteristics of the seamless endless belt obtained.

EXAMPLE 12

The biaxially stretched tube obtained in Example 10-(1) having an inner diameter of 134 mm and a thickness of 25 μm was put on the 15 cylindrical metal drum used in Example 10-(3) and relaxed at 230° C. for 25 minutes to effect preliminary thermosetting and then at the same temperature for 40 minutes to effect thermosetting, whereby a biaxially stretched tube of the polyether-ether-ketone resin having an inner diameter of 113 mm was obtained. The resultant tube was finished by cutting edges on both sides to obtain a seamless endless belt having an inner diameter of 113 mm, a width of 250 mm and a thickness of 33 μm. Table 4 below shows various characteristics of the seamless endless tube obtained.

EXAMPLE 13

The biaxially stretched tube obtained in Example 10-(1) having an inner diameter of 134 mm and a thickness of 40 μm was put on the cylindrical metal drum used in Example 10-(3) and relaxed at 230° C. for 25 minutes to effect preliminary thermo-setting and then at the same temperature for 40 minutes to effect thermosetting, whereby a biaxially stretched tube of the polyether-ether-ketone resin having an inner diameter of 113 mm was obtained. The resultant tube was finished by cutting edges on both sides to obtain a seamless endless belt having an inner diameter of 113 mm, a width of 250 mm and a thickness of 49 μm. Table 4 below shows various characteristics of the seamless endless tube obtained.

As is evident from Table 4, the seamless endless belts of Examples 10 and 11 are extremely high in breakdown load and tear strength as compared with endless belt of Example 12 or 13 which was made of polyether etherketone resin alone and had a thickness of 25 μm or 40 μm.

TABLE 4

| Test items | Example 10 | Example 11 | Example 12 | Example 13 |
| --- | --- | --- | --- | --- |
| Thickness (μ) | 91 | 121 | 33 | 49 |
| Breakdown load (kgf) | 16.8 | 27.1 | 9.7 | 14.5 |
| Elongation (%) | 62 | 83 | 105 | 97 |
| Tear strength (g) | 59.3 | 65.3 | 6.6 | 9.9 |
| Modulus of Elasticity (kg/mm2) | | | | |
| 23° C. | 321 | 373 | 544 | 519 |
| 100° C. | 282 | 337 | 470 | 448 |
| 130° C. | 268 | 319 | 443 | 420 |
| 160° C. | 241 | 292 | 398 | 385 |

What is claimed is:

1. A seamless endless belt comprising laminated resin tubes (A), (B) and (C); the outer and inner tubes (A) and (C) being comprised of a polyetheretherketone resin subjected to a biaxial stretching in both lateral and longitudinal directions by at least 2 times its original dimensions at a temperature above the glass transition temperature of the resin but below the melting point of the resin; intermediate tube (B) being comprised of thermoplastic polyurethane resin, the outer and inner tubes (A), (C) and the intermediate tube (B) being integrally bonded and the outer and inner tubes (A), (C) having been thermoset by heating while relaxed.

2. A seamless endless belt according to claim 1, wherein tubes (A) and (C) have been biaxially stretched at a temperature within the range of 140°–220° C.

3. A seamless endless belt according to claim 1, wherein the tubes (A) and (C) have been stretched in both lateral and longitudinal directions by 2–6 times their original dimensions.

4. A seamless endless belt according to claim 1, wherein the heating of the laminated tubes (A), (B) and (C) has been effected at a temperature of 150°–300° C.

5. A seamless endless belt according to claim 1, wherein the thickness of each tube is at least 20 μm.

* * * * *